(12) United States Patent
Ittelson et al.

(10) Patent No.: US 11,606,400 B2
(45) Date of Patent: Mar. 14, 2023

(54) CAPTURING AND PRESENTING AUDIENCE RESPONSE AT SCALE

(71) Applicant: Zoom Video Communications, Inc., San Jose, CA (US)

(72) Inventors: Brendan James Ittelson, San Jose, CA (US); Pankaj Prasad, San Francisco, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/390,192

(22) Filed: Jul. 30, 2021

(65) Prior Publication Data
US 2023/0032041 A1    Feb. 2, 2023

(51) Int. Cl.
*H04L 65/403*    (2022.01)

(52) U.S. Cl.
CPC ................... *H04L 65/403* (2013.01)

(58) Field of Classification Search
CPC ........... H04N 7/15; H04N 7/147; H04L 29/06
USPC ........................................... 348/14.01–14.16
See application file for complete search history.

(56) References Cited

U.S. PATENT DOCUMENTS

| 9,723,242 | B1 | 8/2017 | Fulay et al. | |
| 2009/0067349 | A1* | 3/2009 | Glueckman | H04L 65/1059 370/260 |
| 2012/0084169 | A1 | 4/2012 | Adair et al. | |
| 2012/0326866 | A1 | 12/2012 | Lemmey et al. | |
| 2013/0002799 | A1* | 1/2013 | Mock | H04N 7/142 348/E7.083 |
| 2016/0226610 | A1* | 8/2016 | Pinzon Gonzales, Jr. | H04N 21/466 |
| 2016/0299965 | A1* | 10/2016 | Starr | G06F 16/335 |
| 2017/0053664 | A1* | 2/2017 | Gonzales, Jr. | G06Q 30/08 |
| 2021/0185276 | A1* | 6/2021 | Peters | G06V 20/41 |
| 2022/0038580 | A1* | 2/2022 | Li | H04L 12/1822 |

FOREIGN PATENT DOCUMENTS

WO    WO-2019089028 A1 *    5/2019    ......... G06Q 30/0201

OTHER PUBLICATIONS

International Search Report and Written Opinion for PCT Application No. PCT/US2022/033939 dated Oct. 13, 2022.

* cited by examiner

*Primary Examiner* — Melur Ramakrishnaiah
(74) *Attorney, Agent, or Firm* — Kilpatrick Townsend & Stockton LLP

(57) ABSTRACT

One example method includes receiving a plurality of responses during a time period, the plurality of responses each provided by one of a plurality of participants in a video conference hosted by a video conference provider, sampling the plurality of responses to identify a plurality of response characteristics, and then generating a consolidated response based at least in part on the plurality of response characteristics. The example method additionally includes causing the consolidated response to be output to at least one of the plurality of participants.

17 Claims, 6 Drawing Sheets

US 11,606,400 B2

CAPTURING AND PRESENTING AUDIENCE RESPONSE AT SCALE

FIELD

The present application generally relates to video conferencing and more specifically relates to capturing and presenting audience response at scale.

BACKGROUND

Videoconferencing has become a common way for people to meet as a group, but without being at the same physical location. Participants can be invited to a video conference meeting, join from their personal computers or smartphones, and are able to see and hear each other and converse largely as they would during an in-person group meeting or event. The advent of user-friendly video conferencing software has enabled teams to work collaboratively despite being dispersed around the country or the world. It has also enabled meeting planners to allow virtual attendance of meetings.

Attending virtual meetings can be more convenient and less expensive than attending in-person meetings. However, video conference providers who create and host the infrastructure for such events may sometimes face challenges unique to the virtual environment.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
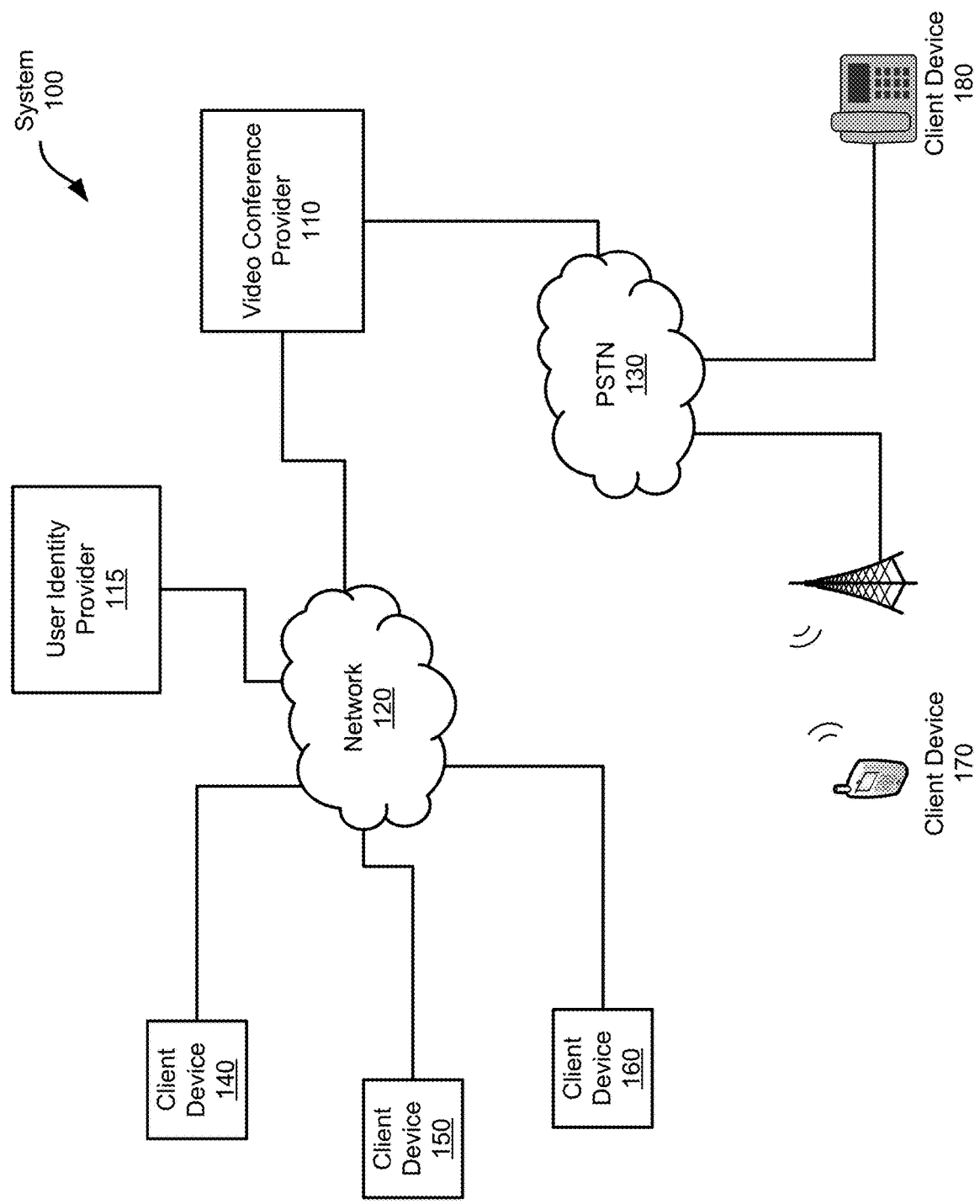
FIGS. 1-3 show example systems for capturing and presenting audience response at scale.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

Examples are described herein in the context of systems and methods for capturing and presenting audience response at scale. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Various examples are described for capturing and presenting audience response at scale. One example method includes receiving a plurality of responses during a time period, the plurality of responses each provided by one of a plurality of participants in a video conference hosted by a video conference provider, sampling the plurality of responses to identify a plurality of response characteristics, and then generating a consolidated response based at least in part on the plurality of response characteristics. The example method additionally includes causing the consolidated response to be output to at least one of the plurality of participants.

One example system includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to receive a plurality of responses during a time period, the plurality of responses each provided by one of a plurality of participants in a video conference hosted by a video conference provider, sample the plurality of responses to identify a plurality of response characteristics, generate a consolidated response based at least in part on the plurality of response characteristics, and cause the consolidated response to be output to at least one of the plurality of participants.

One example non-transitory computer-readable medium comprising processor-executable instructions configured to cause one or more processors to receive a plurality of responses during a time period, the plurality of responses each provided by one of a plurality of participants in a video conference hosted by a video conference provider, sample the plurality of responses to identify a plurality of response characteristics, generate a consolidated response based at least in part on the plurality of response characteristics, and cause the consolidated response to be output to at least one of the plurality of participants.

In one example system for hosting a large virtual event, such as a webinar, responses and interactions that typically occur in a physical environment are captured. A response may include actions such as applause or the roar of the crowd. The response of a participant in a virtual event can be captured by the user's device, such as a laptop or smartphone. In a large virtual event, the client may captures hundreds or even thousands or responses simultaneously.

In the example system, the responses are each transmitted to a video conference provider for processing. In other example systems, the software for processing the responses may be present in client software or at a third-party processing facility. In the example system, once the video conference provider receives the plurality of responses from the virtual attendees, the video conference provider combines the responses and then presents them to, for instance, the presenter.

For example, a user clapping is captured by the client's device. The clap might be captured in any number of ways. For instance, in one example, a microphone attached to or embedded in the client device may capture the response. In another example, the response is captured by a camera in communication with the device. A previously-trained machine learning model can then be used to recognize the response based on various characteristics of the response. For example, a clap might be identified and then sorted by the frequency of the clapping action. Responses from each of the plurality of participants can be captured, identified, and sorted in a similar manner.

Once the reactions have all been captured, a single consolidated response can then be generated. Consolidating the response by include combining the plurality of responses into a single more coherent response. For instance, combining the captured responses together might result in an incoherent, noisy signal that does not accurately reflect the audience reaction as a whole and at scale. However, by processing each reaction and layering it, a unique representation of the responses can be presented. The presentation of the consolidated response may take the form of either a visual or auditory output.

In the example system, in the case of a plurality of claps by various meeting attendees, the system generates a unique applause by layering the different clap input signals with their different timing, both in relation to one another and in terms of the frequency of the claps themselves. Such layering can create a representation of how the combined responses would be experienced in a shared space. For instance, if all the virtual attendees were part of a crowd in a large conference space, each attendee's clap can be layered with all the other claps to sound like the combined applause would sound in a shared physical space. In some example systems, the attendee's response is muted from the video conference feed but is captured nonetheless. In this way, the actual response does not interfere with the generated consolidated response.

In some such example systems, the captured signals are combined into subgroupings and used to create different representations. For instance, such sub grouping may be used to account for spatial differences. For example, in a hybrid event in which some participants are physically present and others are attending virtually, if a small remote group was responding that was only visible on the left hand side of the stage, their applause could only come from speakers on the left side of the stage and the same could be done for those observable on the right side. Therefore, audience interaction that is spatial in nature can be achieved.

In some example systems, audience response signals are used as a form of scoring or voting within a session. Such systems may be used during live events or during pre-recorded events. For example, in one such system, the audience responses are scored and then used to gauge the amount of "energy" of an audience attending a particular host's event and may be used with other such scores to determine a typical score typically associated with a particular host's events. In another example system, such scoring could be used in conjunction with timestamps to determine highlights of a particular session to help with the automatic creation of a highlight reel. Such systems may store an identifier of the virtual attendee with the response or may anonymize the attendee's response, thereby protecting the privacy of the individual.

Such systems provide numerous advantages over conventional video conferencing system. In conventional systems for hosting large virtual events, audience response and interaction is typically much more limited that would be true in a physical environment. This limitation has created a challenge for performers and presenters as well as attendees since the sense of communal participation and response is missing. In conventional systems, the simple act of clapping on a video conference does not scale since the sounds often will redirect focus and an upper limit of participant's audio is hits where distribution and mixing is not possible. And alternatives, such as emojis and other technology solutions, tend to be unnatural. In contrast, example systems as described herein provide a more natural, consolidated response, which provides a presenter with an improved sense of the mood of the crowd. In addition, capturing, combining, and presenting such responses allows a presenter to identify particularly important, meaningful, or engaging elements of a presentation. Similarly, by consolidating the responses, individual attendees may feel more connected to other virtual attendees despite not being physically together.

This illustrative example is given to introduce the reader to the general subject matter discussed herein and the disclosure is not limited to this example. The following sections describe various additional non-limiting examples and examples of systems and methods for capturing and presenting audience response at scale.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
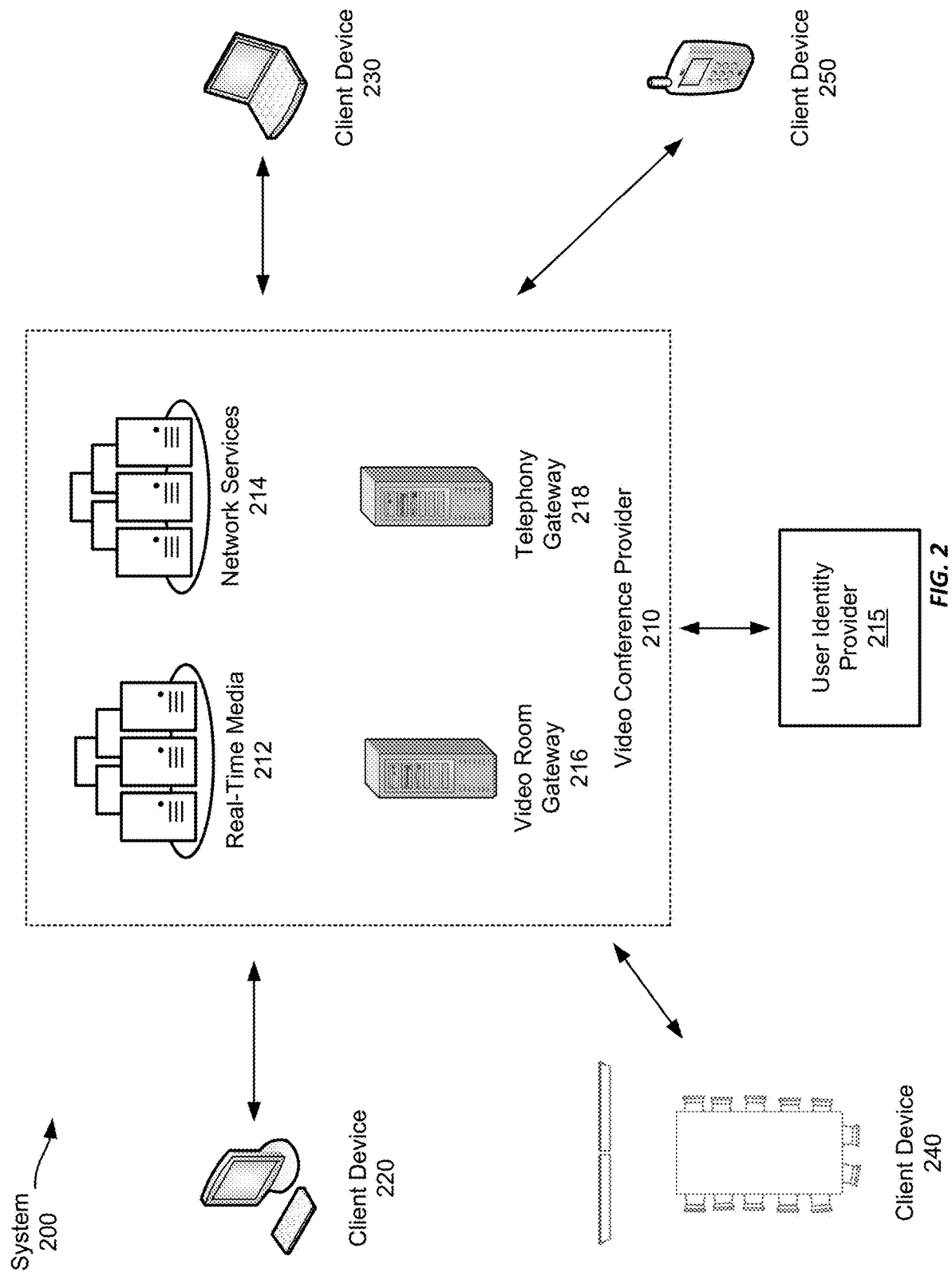

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
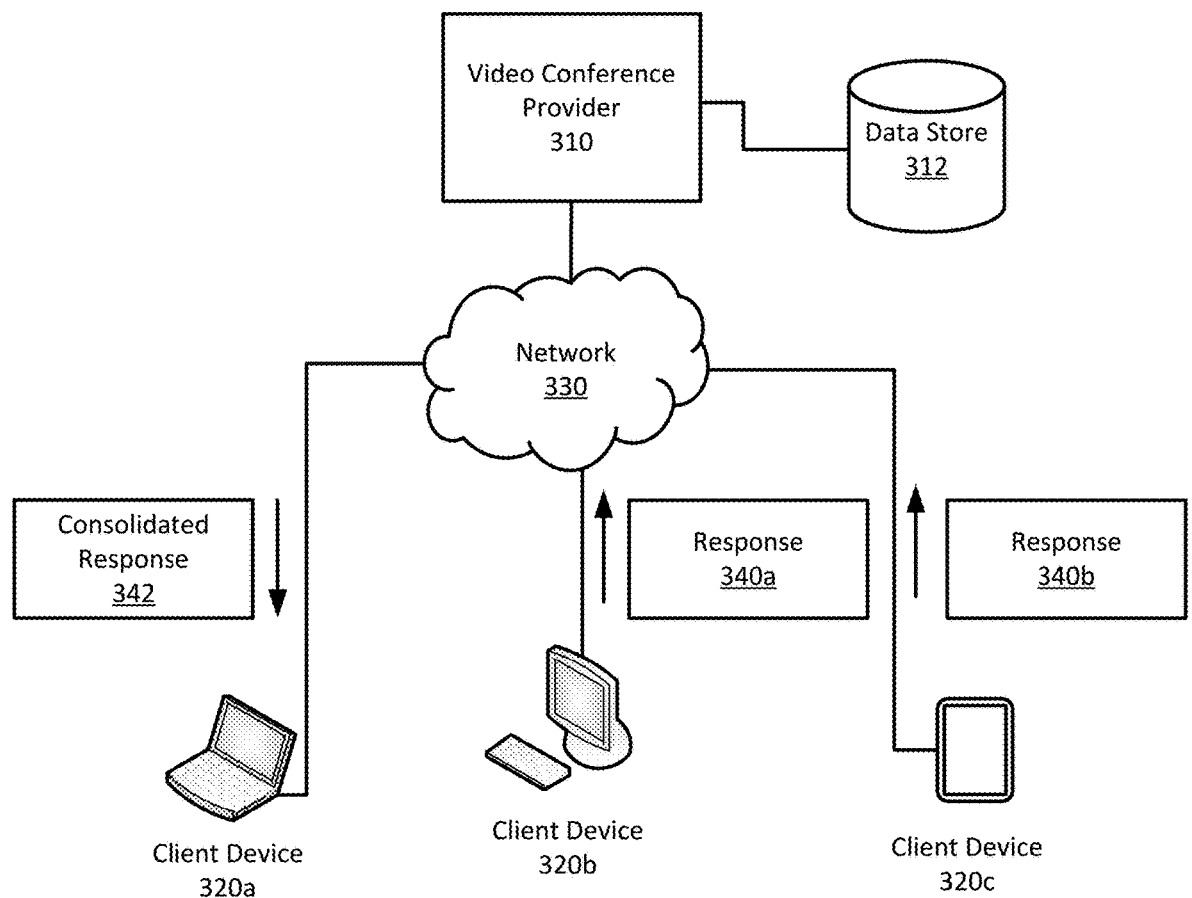

Referring now to FIG. 3, FIG. 3 shows an example system 300 for capturing and presenting audience response at scale. The example system 300 includes multiple client device 320*a-c*, which allow participants to access video conferences facilitated by the video conference provider 310, such as over network 330. Video conference provider 310 stores various information regarding scheduled video conferences and other information in data store 312.

In the embodiment shown, users utilize client devices 320*b-c* to access a video conference. During the video conference, those users provide a plurality of responses 340*a-b*. For example, the users may applaud during portions of the video conference. Alternatively, the users may provide voice responses during the video conference. The plurality of responses is received by video conference provider 310 via the network 330.

The video conference provider 310 may then analyze the various responses 340*a-b*. For example, the video conference provider 310 may take samples periodically from the responses 340*a-b* to determine characteristics of the responses, such as the frequency or magnitude of each of the responses. Then, based on the analysis, the video conference provider can generate a consolidated response 342 and cause that response to be output on the client device 320*a*. The consolidated response is different than a response that would be output by simply combining the plurality of response input signals received from each participant. In other words, the input signals are not simply combined in raw form and then output together as would be done in a conventional system.

For example, the video conference provider may receive applause from client devices 320*b-c*. Video conference provider can then sample the applause to determine the frequency and magnitude of the applause from each device. The video conference provider can then compare that to synthesized applause stored in data store 312 to determine which synthesized applause best represents the plurality of responses 340*a-b* received from the client devices 320*b-c*. Determine the most representative applause may involve using a machine learning model that accepts the response characteristics as input and provides the synthesized applause in response.

Figure 4:
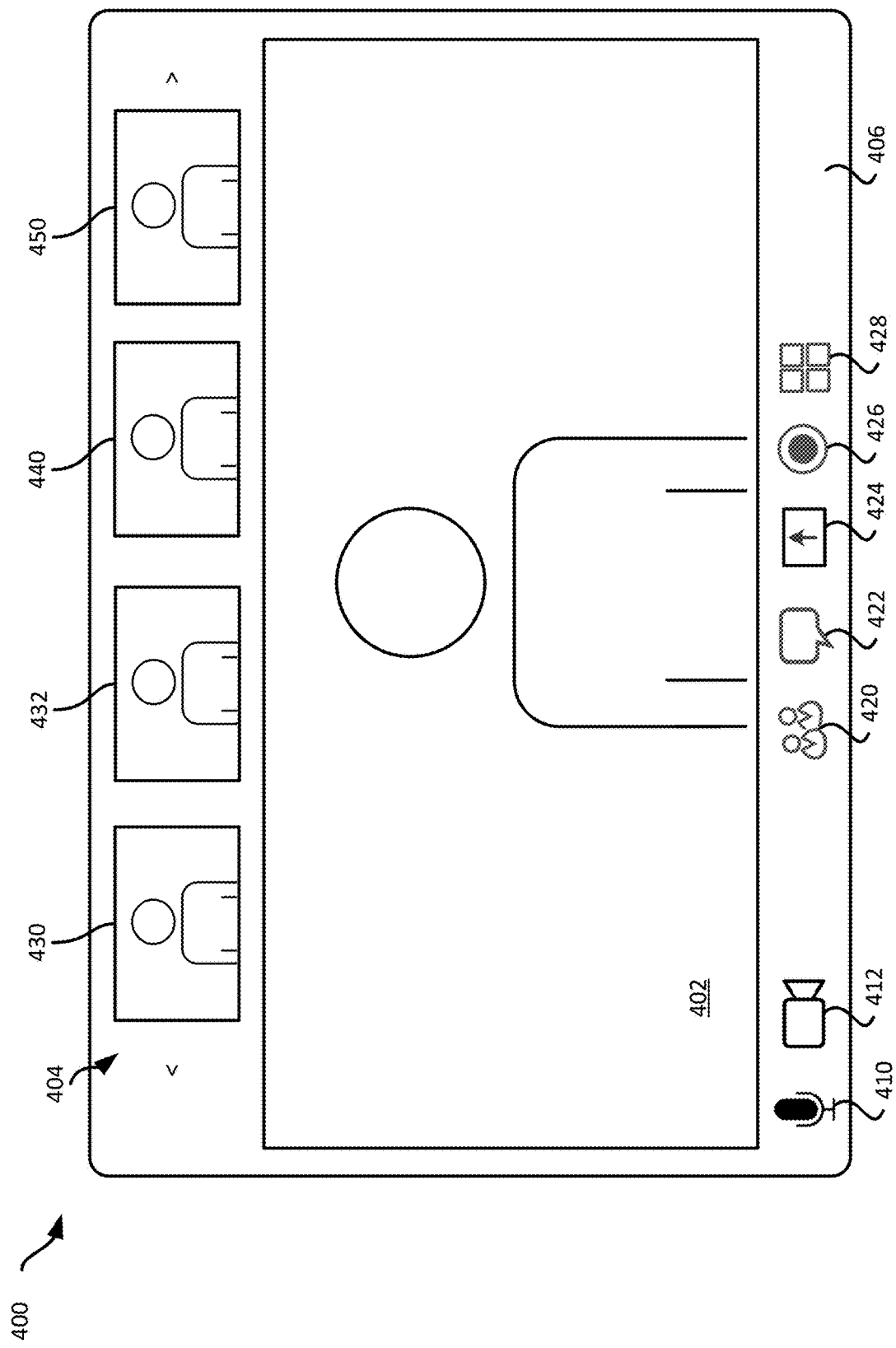
FIG. 4 shows an example GUI for capturing and presenting audience response at scale.

Referring now to FIG. 4, FIG. 4 shows an example GUI for video conference software that may be executed by one or more client devices according to this disclosure and is described in relation to the system illustrated in FIG. 3. In this example, the GUI 400 executing on client device 320*a* includes a speaker view window 402 that presents the current speaker in the meeting. Above the speaker view window 402 are smaller participant windows 404, which allow the user to view other participants in the main meeting, as well as controls ("<" and ">") to let the user scroll to view other participants in the meeting.

Beneath the speaker view window 402 are a number of interactive elements 410-428 to allow the host to interact with the video conference software. Controls 410-412 may allow the host to toggle on or off audio or video streams captured by a microphone or camera connected to the host client device. Control 420 allows the participant to view any other participants in the meeting with the user, while control 422 allows the user to send text messages to other participants, whether to specific participants or to the entire meeting. Control 424 allows the user to share content from their client device. Control 426 allows the user to toggle recording of the meeting, and control 428 allows the user to select an option to join a breakout room.

In this particular example, the host of the meeting is viewing the various other participants 430-450. Each of the participants 430-450 may provide responses during the host's presentation. For example, while the host is presenting, each of the participants 430-450 may applaud, respond verbally, or click on a control to indicate a reaction to the presentation. In the example shown, the individual responses are muted, i.e., the host will not hear the individual responses as they are made by the participants. Instead, the video conference provider 310 will receive each of the plurality of responses and then generate a consolidated response which will then be output by the user interface 400 on the client device 320*a*.

Figure 5:
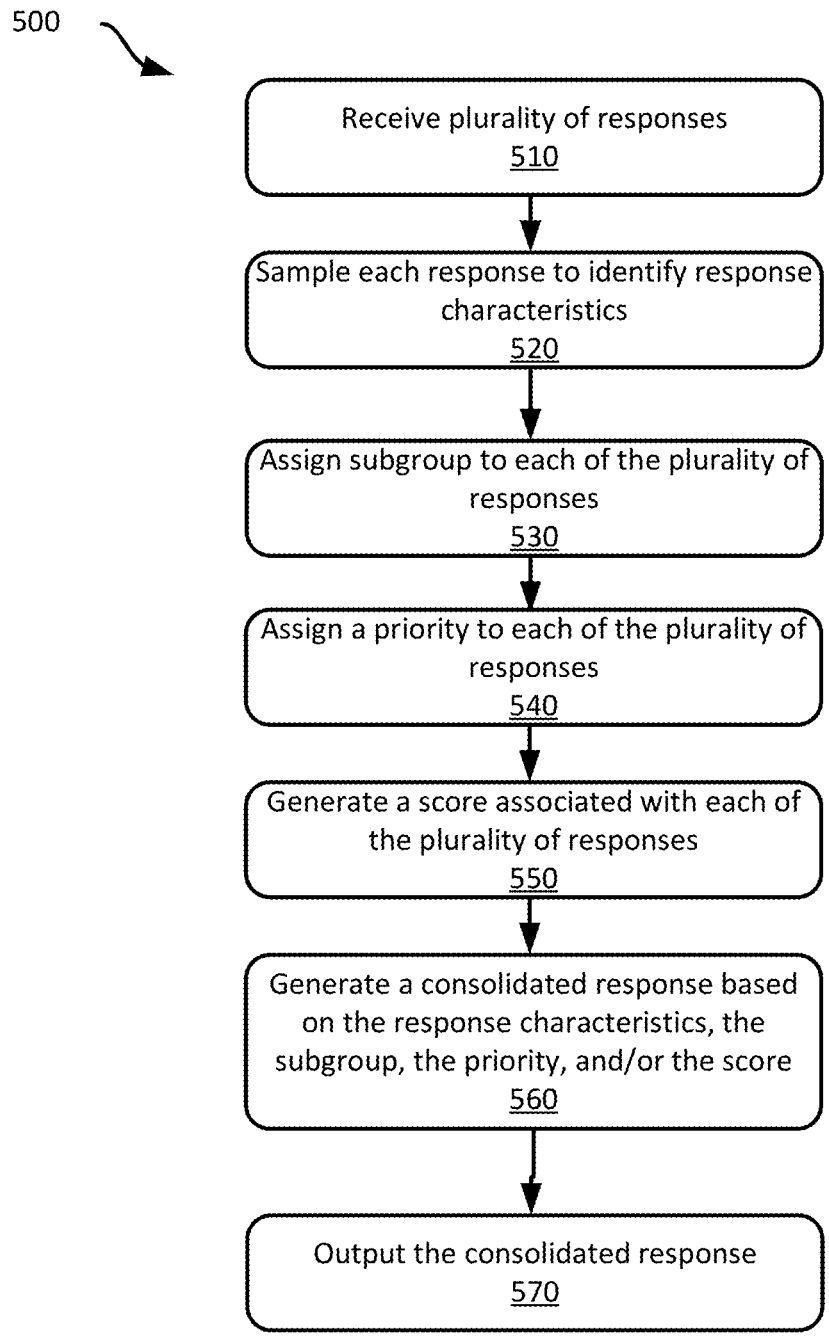
FIG. 5 shows an example method for capturing and presenting audience response at scale.

Referring now to FIG. 5, FIG. 5 shows an example method 500 for capturing and presenting audience response at scale. This example method 500 will be discussed with respect to the example system 300 shown in FIG. 3; however, any suitable system according to this disclosure may be employed according to various examples, including the systems 100, 200, 700 shown in FIGS. 1, 2 and 7.

At block 510, the video conference provider 310 receives a plurality of responses from the participants in the video conference. The responses may include feedback such as applause, verbal feedback, visual feedback, such as a thumbs up gesture, or feedback based on the user clicking a control on their device. In some example systems, the feedback is identified as such and is muted so that it cannot be heard by other participants on the video conference. For example, the user may have muted themselves using a control on the video conference interface so that none of the participant's audible actions can be heard by participants in the video conference. Alternatively, the software executing on the client device may be capable of identifying feedback, such as by identifying a sound with a frequency and magnitude that matches applause, and muting the feedback automatically but leaving the remainder of the audio feed unaffected.

At block 520, the video conference provider 310 samples each of the plurality of responses to identify response characteristics, i.e., characteristics of the received response during the sampling period. For instance, the video conference provider 310 may determine that applause typically ranges between 0.1 and 10 kHz, depending on how the participant is clapping. Thus, the video conference provider 310 would set a sampling rate optimized to accurately capture such signals. The video conference provider 310 may capture various properties or characteristics of the response. For example, the video conference provider 310 may capture the frequency and magnitude of the response. Other characteristics of applause might include the cadence, octave, or resonance of a particular response. Similar characteristics may be present for other types of responses. For example, a laugh would include a frequency and a magnitude, identifying it as a loud or quiet laugh. The video conference provider 310 is then able to determine information about the response based on those characteristics. For example, the video conference provider might provide the magnitude and the frequency of the response as inputs into a machine learning model that has been trained to identify various types of responses based on these characteristics. Other known methods for identifying such responses may also be used.

In the example shown in FIG. 5 at block 530, the video conference provider assigns a subgroup to each of the plurality of responses. For instance, the video conference provider 310 might utilize the relative virtual position of a participant in the video conference to assign a grouping, such as left, center, or right to a particular response. Such subgroups could then be used to layer the various responses later in the process.

At block 540 assign, the video conference provider 310 assigns a priority to each of the plurality of responses. The priority could, for example, be a number between 1 and 10, indicating the importance of the audience member. In other examples, the priority could be assigned to different types of response. For instance, a response provided via a control on the user interface may receive a relatively higher priority than a verbal response, depending on parameters set by the video conference provider 310 or by the users.

At block 550, the video conference provider 310 generates a score associated with each of the plurality of responses. For example, a loud clap may be associated with a high score since it indicates a stronger approval of the content. Similarly, a loud oral response may be assigned a high score. Alternatively, the user may be able to provide a numeric indicator that can be used by the video conference provider 310 to generate the score. For instance, the user might select from three ratings—low, middle, high—indicating the user's approval of particular content of the video conference, which the video conference provider 310 can then use to generate the score assigned to the response.

At block 560 the video conference provider generates a consolidated response that is based at least in part on the response characteristics, or information generated from the characteristics, such as the subgroup, the priority, and/or the score associated with particular responses. The consolidated response might, for example, be a generated applause generated by layering the participants clapping and that resembles a group clapping in the room in which the host is sitting. In another example, various consolidated responses may be created and stored in the data store. Then, when the consolidated response is to be generated, the video conference provider 310 can retrieve one or more of the stored consolidated responses by querying the database. In one example, the video conference provider 310 utilizes a machine learning model to identify a previously-generated consolidated response to provide to a user.

At block 570, the video conference provider 310 causes the consolidated response to be output. For instance, the video conference provider 310 may transmit the consolidated response to a client device 320a. Then client device 320a can output the consolidated response via, for example, speakers that are embedded in or connected to client device 320a. The consolidated response that is output is reflective of a plurality of responses received from participants in the video conference.

While the process illustrated in FIG. 5 shows a single iteration of receiving responses and using them to generate a consolidated response, may iterated the process shown continuously during a video conference to provide ongoing consolidated feedback to the host. Further, various steps shown in the process of FIG. 5 may be omitted and additional steps added without changing the nature of the illustrated process.

Figure 6:
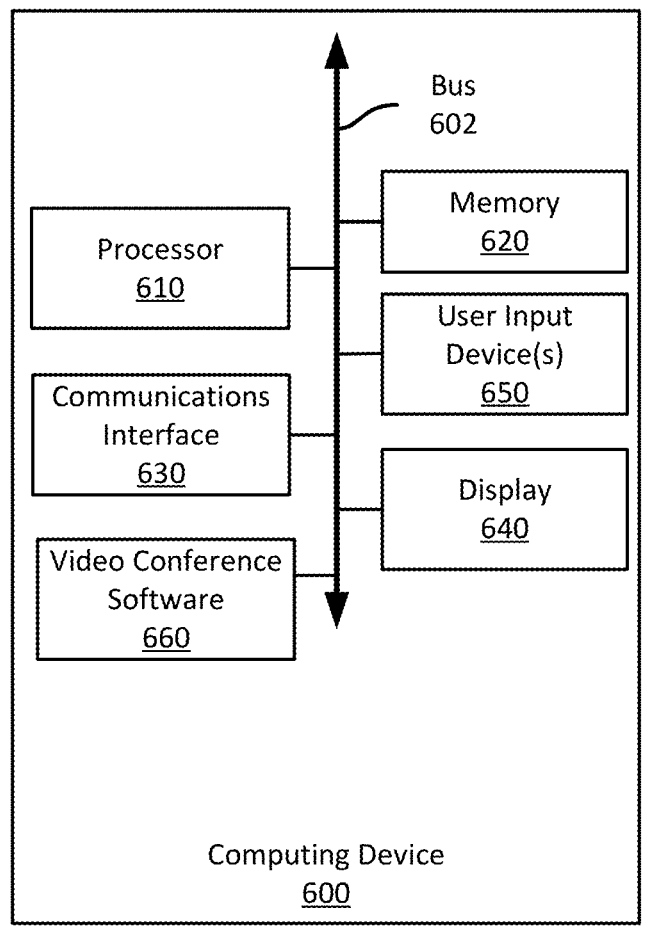
FIG. 6 shows an example computing device suitable for use with systems and methods for capturing and presenting audience response at scale.

Referring now to FIG. 6, FIG. 6 shows an example computing device 600 suitable for use in example systems or methods for hiding private user data in public signature chains for user authentication in video conferences according to this disclosure. The example computing device 600 includes a processor 610 which is in communication with the memory 620 and other components of the computing device 600 using one or more communications buses 602. The processor 610 is configured to execute processor-executable instructions stored in the memory 620 to perform one or more methods for capturing and presenting audience response at scale according to different examples, such as part or all of the example methods 400-600 described above with respect to FIGS. 4-6. The computing device 600, in this example, also includes one or more user input devices 650, such as a keyboard, mouse, touchscreen, microphone, etc., to accept user input. The computing device 600 also includes a display 640 to provide visual output to a user.

In addition, the computing device 600 includes video conference software 660 to enable a user to join and participate in a video conference, such as a conventional meeting or webinar, by receiving multimedia streams from a video conference provider, sending multimedia streams to the video conference provider, joining and leaving breakout rooms, such as described throughout this disclosure, etc.

The computing device 600 also includes a communications interface 640. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, by the video conference provider, a plurality of responses during a time period, the plurality of responses each provided by one of a plurality of participants in a video conference hosted by a video conference provider;
sampling, by the video conference provider, the plurality of responses to identify a plurality of response characteristics;
generating, by the video conference provider, a plurality of subgroups of responses, each corresponding to a portion of the plurality of responses;
generating, by the video conference provider, a response layer corresponding to each of the plurality of subgroups;
generating, by the video conference provider, a consolidated response based at least in part on the plurality of response characteristics, wherein generating the consolidated response comprises combining the response layers; and
causing, by the video conference provider, the consolidated response to be output to at least one of the plurality of participants.

2. The method of claim 1, further comprising muting, by the video conference provider, each of the plurality of responses from an audio feed of the video conference.

3. The method of claim 1, wherein the plurality of responses comprises a plurality of audio responses and the plurality of response characteristics includes a frequency and a magnitude of the response.

4. The method of claim 3, wherein generating the consolidated response comprises averaging, by the video conference provider, the frequency and the magnitude across the plurality of audio responses.

5. The method of claim 1, wherein generating the consolidated responses comprises determining, by the video conference provider, a previously-stored response associated with the plurality of response characteristics.

6. The method of claim 1, wherein each response layer is associated with a spatial characteristic.

7. The method of claim 1, further comprising determining, by the video conference provider, a score associated with at least some of the response characteristics.

8. The method of claim 7, wherein generating the consolidated response further comprises utilizing the score to prioritize certain of the plurality of responses.

9. The method of claim 7, wherein the score is associated with an interest level and a time.

10. The method of claim 1, wherein the plurality of responses is pre-recorded.

11. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:

receive a plurality of responses during a time period, the plurality of responses each provided by one of a plurality of participants in a video conference hosted by a video conference provider;

sample the plurality of responses to identify a plurality of response characteristics;

generate a plurality of subgroups of responses, each corresponding to a portion of the plurality of responses;

generate a response layer corresponding to each of the plurality of subgroups;

generate a consolidated response based at least in part on the plurality of response characteristics, wherein generating the consolidated response comprises combining the response layers; and cause the consolidated response to be output to at least one of the plurality of participants.

12. The system of claim 11, wherein the one or more processors are configured to execute further processor-executable instructions stored in the non-transitory computer-readable medium to mute each of the plurality of responses from an audio feed of the video conference.

13. The system of claim 11, wherein the one or more processors are configured to execute further processor-executable instructions stored in the non-transitory computer-readable medium to determine a score associated with at least some of the response characteristics.

14. The system of claim 13, wherein the one or more processors are configured to execute further processor-executable instructions stored in the non-transitory computer-readable medium to generate the consolidated response utilizing the score to prioritize certain of the plurality of responses.

15. The system of claim 13, wherein the score is associated with an interest level and a time.

16. A non-transitory computer-readable medium comprising processor-executable instructions configured to cause one or more processors to:

receive a plurality of responses during a time period, the plurality of responses each provided by one of a plurality of participants in a video conference hosted by a video conference provider;

sample the plurality of responses to identify a plurality of response characteristics;

generate a plurality of subgroups of responses, each corresponding to a portion of the plurality of responses;

generate a response layer corresponding to each of the plurality of subgroups;

generate a consolidated response based at least in part on the plurality of response characteristics, wherein generating the consolidated response comprises combining the response layers; and cause the consolidated response to be output to at least one of the plurality of participants.

17. The non-transitory computer-readable medium of claim 16, further comprising processor-executable instructions configured to cause one or more processors to mute each of the plurality of responses from an audio feed of the video conference.

* * * * *